US009497109B2

(12) United States Patent
Wakumoto et al.

(10) Patent No.: US 9,497,109 B2
(45) Date of Patent: Nov. 15, 2016

(54) SWITCHING MESH WITH USER-CONFIGURABLE PATHS

(75) Inventors: Shaun Kazuo Wakumoto, Roseville, CA (US); Ballard Claude Bare, Auburn, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 2683 days.

(21) Appl. No.: 11/056,990

(22) Filed: Feb. 11, 2005

(65) Prior Publication Data

US 2006/0182082 A1 Aug. 17, 2006

(51) Int. Cl.
*H04L 12/28* (2006.01)
*G06F 15/173* (2006.01)
*H04L 12/703* (2013.01)
*H04L 12/24* (2006.01)
*H04L 12/707* (2013.01)

(52) U.S. Cl.
CPC ......... *H04L 45/28* (2013.01); *H04L 41/0659* (2013.01); *H04L 41/0806* (2013.01); *H04L 41/12* (2013.01); *H04L 45/22* (2013.01)

(58) Field of Classification Search
USPC ....... 370/400, 351, 406, 392, 254, 225, 238, 370/386
See application file for complete search history.

(56) References Cited

U.S. PATENT DOCUMENTS

| | | | | |
|---|---|---|---|---|
| 4,034,192 A * | 7/1977 | Kishi et al. | | 700/189 |
| 4,736,363 A * | 4/1988 | Aubin et al. | | 370/400 |
| 5,247,517 A * | 9/1993 | Ross et al. | | 370/452 |
| 5,319,707 A * | 6/1994 | Wasilewski et al. | | 380/212 |
| 5,446,915 A * | 8/1995 | Pierce | | 712/11 |
| 5,491,693 A * | 2/1996 | Britton et al. | | 370/401 |
| 5,521,910 A * | 5/1996 | Matthews | | 370/256 |
| 5,539,739 A * | 7/1996 | Dike et al. | | 370/352 |
| 5,579,385 A * | 11/1996 | Wille et al. | | 379/230 |
| 5,689,585 A * | 11/1997 | Bloomberg et al. | | 382/229 |
| 5,734,652 A * | 3/1998 | Kwok | | 370/395.2 |
| 5,802,286 A * | 9/1998 | Dere et al. | | 709/220 |
| 5,892,922 A * | 4/1999 | Lorenz | | 709/238 |
| 6,091,725 A * | 7/2000 | Cheriton et al. | | 370/392 |
| 6,167,445 A * | 12/2000 | Gai et al. | | 709/223 |
| 6,295,276 B1 * | 9/2001 | Datta et al. | | 370/218 |
| 6,314,093 B1 * | 11/2001 | Mann | | H04L 45/12 370/254 |
| 6,377,265 B1 * | 4/2002 | Bong | | 345/505 |
| 6,396,868 B1 * | 5/2002 | Yoon et al. | | 375/146 |
| 6,438,110 B1 * | 8/2002 | Rai et al. | | 370/254 |
| 6,493,318 B1 | 12/2002 | Bare | | |

(Continued)

FOREIGN PATENT DOCUMENTS

| | | | | | |
|---|---|---|---|---|---|
| EP | 1009141 A1 * | 6/2000 | | | H04L 29/06 |
| EP | 1126669 A1 * | 8/2001 | | | H04L 12/56 |

OTHER PUBLICATIONS

Policy-Based Routing Cisco Systems (1996).*

*Primary Examiner* — Marsha D. Banks Harold
*Assistant Examiner* — Christopher Wyllie
(74) *Attorney, Agent, or Firm* — Okamoto & Benedicto LLP

(57) ABSTRACT

One embodiment disclosed relates to a method of configuring a traffic-associated path through a switching mesh. A source switch receives a request to associate a type of traffic to a specified path. The source switch is located at the beginning of the path. A path tag is allocated to the path. The path through the mesh is built, and the association between the type of traffic and the allocated path tag is programmed. Other embodiments are also disclosed.

8 Claims, 6 Drawing Sheets

(56) References Cited

U.S. PATENT DOCUMENTS

| | | | |
|---|---|---|---|
| 6,529,513 B1* | 3/2003 | Howard et al. | 370/401 |
| 6,577,600 B1* | 6/2003 | Bare | 370/238 |
| 6,580,715 B1 | 6/2003 | Bare | |
| 6,603,746 B1* | 8/2003 | Larijani et al. | 370/318 |
| 6,647,428 B1* | 11/2003 | Bannai | H04L 29/12009 370/253 |
| 6,671,729 B1* | 12/2003 | Gordon et al. | 709/227 |
| 6,674,768 B1* | 1/2004 | Okamura | 370/468 |
| 6,731,729 B2* | 5/2004 | Eng et al. | 379/121.03 |
| 6,757,670 B1* | 6/2004 | Inohara et al. | 707/3 |
| 6,772,205 B1* | 8/2004 | Lavian et al. | 709/223 |
| 6,798,791 B1* | 9/2004 | Riazi et al. | 370/515 |
| 6,829,347 B1* | 12/2004 | Odiaka | 379/220.01 |
| 6,847,657 B1* | 1/2005 | Bendak et al. | 370/509 |
| 6,971,098 B2* | 11/2005 | Khare et al. | 718/101 |
| 6,992,987 B2* | 1/2006 | Kobayashi | 370/252 |
| 7,023,829 B1* | 4/2006 | Holmquist et al. | 370/341 |
| 7,039,740 B2* | 5/2006 | Glasco et al. | 710/266 |
| 7,095,712 B2* | 8/2006 | Kinoshita et al. | 370/217 |
| 7,181,499 B1* | 2/2007 | Ellanti et al. | 709/216 |
| 7,242,664 B2* | 7/2007 | Einstein et al. | 370/216 |
| 7,257,081 B2* | 8/2007 | Rajan et al. | 370/231 |
| 7,330,425 B1* | 2/2008 | Gulati et al. | 370/225 |
| 7,382,734 B2* | 6/2008 | Wakumoto | H04L 12/2697 370/248 |
| 7,415,016 B1* | 8/2008 | Yip | H04L 12/4645 370/392 |
| 7,447,223 B2* | 11/2008 | Wakumoto | H04L 45/02 370/406 |
| 7,623,533 B2* | 11/2009 | Wakumoto | H04L 45/48 370/256 |
| 7,680,952 B1* | 3/2010 | Pan | H04L 41/0668 370/237 |
| 7,813,346 B1* | 10/2010 | Kuwabara | H04L 45/00 370/235 |
| 2001/0019558 A1* | 9/2001 | Suzuki et al. | 370/465 |
| 2002/0009073 A1* | 1/2002 | Furukawa et al. | 370/352 |
| 2002/0028656 A1* | 3/2002 | Yemini et al. | 455/41 |
| 2002/0045453 A1* | 4/2002 | Juttner et al. | 455/445 |
| 2002/0059432 A1* | 5/2002 | Masuda et al. | 709/227 |
| 2002/0085545 A1* | 7/2002 | Ku et al. | 370/369 |
| 2002/0122546 A1* | 9/2002 | Brogne et al. | 379/221.01 |
| 2002/0124105 A1* | 9/2002 | Block | H04L 49/351 709/238 |
| 2002/0145981 A1* | 10/2002 | Klinker | H04L 12/5695 370/244 |
| 2002/0186682 A1* | 12/2002 | Kawano et al. | 370/351 |
| 2003/0005148 A1* | 1/2003 | Mochizuki et al. | 709/238 |
| 2003/0016624 A1* | 1/2003 | Bare | 370/217 |
| 2003/0035426 A1* | 2/2003 | Tagore-Brage | H04L 49/254 370/392 |
| 2003/0048750 A1* | 3/2003 | Kobayashi | H04L 45/00 370/229 |
| 2003/0161304 A1* | 8/2003 | deBoer | H04L 45/00 370/386 |
| 2003/0189925 A1* | 10/2003 | Wellbaum et al. | 370/372 |
| 2004/0004938 A1* | 1/2004 | Buddhikot et al. | 370/238 |
| 2004/0042402 A1* | 3/2004 | Galand et al. | 370/237 |
| 2004/0090943 A1* | 5/2004 | da Costa et al. | 370/338 |
| 2004/0103153 A1* | 5/2004 | Chang et al. | 709/206 |
| 2004/0170201 A1* | 9/2004 | Kubo et al. | 370/535 |
| 2004/0184483 A1* | 9/2004 | Okamura | 370/477 |
| 2004/0190446 A1* | 9/2004 | Ansorge et al. | 370/228 |
| 2004/0196848 A1* | 10/2004 | Wang et al. | 370/395.2 |
| 2004/0218525 A1* | 11/2004 | Elie-Dit-Cosaque | H04L 41/0631 370/223 |
| 2004/0248576 A1* | 12/2004 | Ghiglino et al. | 455/445 |
| 2005/0002339 A1* | 1/2005 | Patil et al. | 370/237 |
| 2005/0074019 A1* | 4/2005 | Handforth et al. | 370/406 |
| 2005/0138306 A1* | 6/2005 | Panchbudhe et al. | 711/162 |
| 2005/0213582 A1* | 9/2005 | Wakumoto | H04L 12/5695 370/395.3 |
| 2005/0259587 A1* | 11/2005 | Wakumoto | H04L 12/2697 370/248 |
| 2005/0259647 A1* | 11/2005 | Wakumoto | H04L 45/00 370/389 |
| 2006/0028991 A1* | 2/2006 | Tan et al. | 370/237 |
| 2006/0146694 A1* | 7/2006 | Hamaguchi et al. | 370/216 |
| 2006/0176880 A1* | 8/2006 | Bare et al. | 370/392 |
| 2006/0182082 A1* | 8/2006 | Wakumoto | H04L 41/0806 370/351 |
| 2008/0175233 A1* | 7/2008 | Chung et al. | 370/356 |
| 2010/0145601 A1* | 6/2010 | Kurtti et al. | 701/200 |

\* cited by examiner

420

SWITCHING MESH WITH USER-CONFIGURABLE PATHS

CROSS-REFERENCE TO RELATED APPLICATION

The present application is related to U.S. patent application Ser. No. 10/812,267, entitled "Load Balancing with Mesh Tagging," filed Mar. 29, 2004 by inventors Shaun K. Wakumoto et al. The disclosure of the aforementioned U.S. patent application Ser. No. 10/812,267 is hereby incorporated by reference.

BACKGROUND OF THE INVENTION

1. Field of the Invention

The present invention relates generally to communication networks. More specifically, the present invention relates to network switches and switch-to-switch protocols.

2. Description of the Background Art

It is common in conventional computing environments to connect a plurality of computing systems and devices through a communication medium often referred to as a network. Such networks among communicating devices permit devices (or users of devices) to easily exchange and share information among the various devices.

Networked computing systems may be configured and graphically depicted in a wide variety of common topologies. In other words, the particular configurations of network communication links (also referred to as paths) and devices between a particular pair of devices wishing to exchange information may be widely varied. Any particular connection between two computers attached to a network may be direct or may pass through a large number of intermediate devices in the network. Computing networks are therefore complex and vary in their configurations and topologies.

Certain network communication media and protocols are referred to as packet oriented. A protocol or communication medium may be said to be packet oriented in that information to be exchanged over the network is broken into discrete sized packets of information. A block of information to be transferred over the network is decomposed into one or more packets for purposes of transmission over the network. At the receiving end of the network transmission, the packets are re-assembled into the original block of data.

In general, each packet includes embedded control and addressing information that identifies the source device which originated the transmission of the packet and which identifies the destination device to which the packet is transmitted. Identification of source and destination devices is by means of an address associated with each device. An address is an identifier which is unique within the particular computing network to identify each device associated with the network. Such addresses may be unique to only a particular network environment (i.e., a network used to interconnect a single, self-contained computing environment) or may be generated and assigned to devices so as to be globally unique in co-operation with networking standards organizations.

At one level of network communication, such addresses are often referred to as MAC address (Media ACcess address). Network protocols operable above this lowest level of communication may use other addresses for other purposes in the higher-level communication techniques.

In many conventional commercially-available network environments, the network communication medium is in essence a bus commonly attached to a plurality of devices over which the devices exchange. In a simple networking topology, all devices may be attached to such a bus-structured common network medium. Any particular single network medium has a maximum data exchange bandwidth associated therewith. The maximum data exchange bandwidth of a medium is determined by a number of electrical and physical properties of the medium and protocols used to communicate over that medium. For example, a popular family of related network media and protocols are collectively referred to as Ethernet. Ethernet defines a standard protocol for the exchange of messages over the communication medium. A variety of communication media are also defined as part of the Ethernet family. The communication bandwidth of the Ethernet family of standards may change over time, but conventionally ranges from approximately 10 Mbit (megabits or million bits of information) per second to 1 Gbit (gigabits or billion bits of information) per second. Therefore, a single (slow) Ethernet connection, for example, has a maximum data exchange bandwidth of approximately 10 Mbit per second.

In conventional network computing environments, a number of devices are used in addition to interconnected computing systems to efficiently transfer data over the network. Routers and switches are in general network devices which segregate information flows over various segments of a computer network. A network segment may be defined as any subset of the network computing environment including devices and their respective interconnecting communication links.

As noted above, a single computer network communication link has a maximum data transfer bandwidth parameter defining the maximum rate of information exchange over that network. Where all devices on a computer network share a common network medium, the maximum bandwidth of the computer network may be rapidly reached. The overall performance of the networked computing environment may be thereby reduced because information exchange requests may have to await completion of earlier information exchange requests presently utilizing the communication link.

It is often the case, however, that particular subsets of devices attached to the network have requirements for voluminous communication among members of the same subset but less of a requirement for information exchange with other devices outside their own subset. Though standard switch features generally do not include identifying such logical groupings of devices, some enhanced switching features do permit such logic to be performed within a switch device. For example, some enhanced switch features include the concept of defining and routing information based on virtual LAN (VLAN) definitions. In a VLAN, a group of devices may be defined as logically being isolated on a separate network although physically they are connected to a larger network of devices. VLAN features of enhanced switches are capable of recognizing such VLAN information and can route information appropriately so that devices in a particular VLAN are logically segregated from devices outside the VLAN.

For example, the financial department of a large corporation may have significant information exchange requirements within the financial department but comparatively insignificant needs for data exchange with other departments. Likewise, an engineering group may have significant needs for data exchange within members (computing systems and devices) of the same engineering group but not outside the engineering group. There may in fact be multiple of such subsets of devices in a typical computing network.

It is therefore desirable to segregate such subsets of devices from one another so as to reduce the volume of information exchange applied to the various segments of the computer network.

In particular, a switch device is a device that filters out packets on the network destined for devices outside a defined subset (segment) and forwards information directed between computing devices on different segments of a networked computing environment. The filtering and forwarding of such information is based on configuration information within the switch that describes the data packets to be filtered and forwarded in terms of source and/or destination address information (once address locations are "learned" by the switch(es)).

Network switch devices and protocols associated therewith are also used to manage redundant paths between network devices. Where there is but a single path connecting two network devices, that single path, including all intermediate devices between the source and destination devices, represent a single point of failure in network communications between that source and destination device. Therefore, some network computing environments utilize a plurality of redundant paths to enhance reliability of the network. Having multiple paths between two devices enhances reliability of network communication between the devices by allowing for a redundant (backup) network path to be used between two devices when a primary path fails.

SUMMARY

One embodiment of the invention pertains to a method of configuring a traffic-associated path through a switching mesh. A source switch receives a request to associate a type of traffic to a specified path. The source switch is located at the beginning of the path. A path tag is allocated to the path. The path through the mesh is built, and the association between the type of traffic and the allocated path tag is programmed.

Another embodiment of the invention pertains to a switching apparatus able to configure a traffic-associated path through a switching mesh. The apparatus includes a plurality of ports, a switch control device coupled to the plurality of ports, a processor for executing instructions, memory for storing data and instructions for the processor, and a communication system interconnecting the processor, the memory, and the switch control device. The memory includes instructions for the processor to receive a request to associate a type of traffic to a specified path beginning at the apparatus, to allocate a path tag to the path, to initiate generation of the path through the switching mesh, and to program the association between the type of traffic and the allocated path tag.

Other embodiments are also disclosed.

DETAILED DESCRIPTION

A. Switching Mesh and Path Tagging

Figure 1:
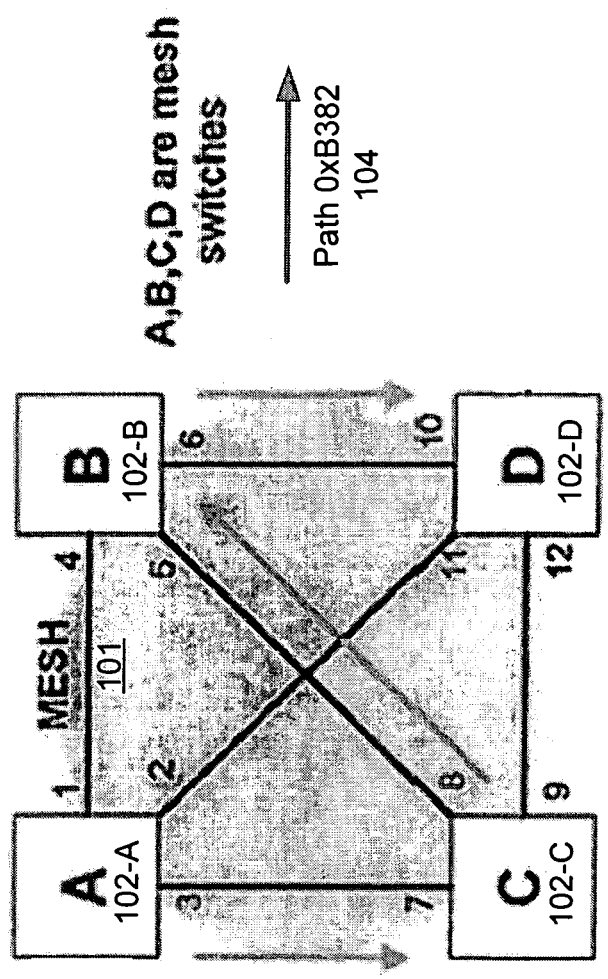
FIG. 1 is a schematic diagram depicting a switching mesh in accordance with an embodiment of the invention.

FIG. 1 is a schematic diagram depicting a switching mesh 101 in accordance with an embodiment of the invention. One example path 104 is shown in FIG. 1. This path 104, designated in this instance as path 0xB382, travels as follows: exits port 3 of switch A 102-A; enters port 7 of switch C 102-C; exits port 8 of switch C 102-C; enters port 5 of switch B 102-B; exits port 6 of switch B 102-B; and enters port 10 of switch D 102-D.

In accordance with an embodiment of the invention, mesh tagging is utilized to advantageously identify paths within the mesh 101 from a source switch to a destination switch. In one implementation, each source/destination pair may be configured with up to thirty-one different paths. This is because four bits are used for the path identifier in a path tag and the zero value is considered invalid in this specific implementation. One example of such a path tag is described further below in relation to FIG. 2. Other embodiments may provide a different number of broadcast paths per switch by using a different number of bits for the path identifier. For example, if the path identifier has six bits, then each source/destination pair may be configured with sixty-three different paths.

Figure 2:
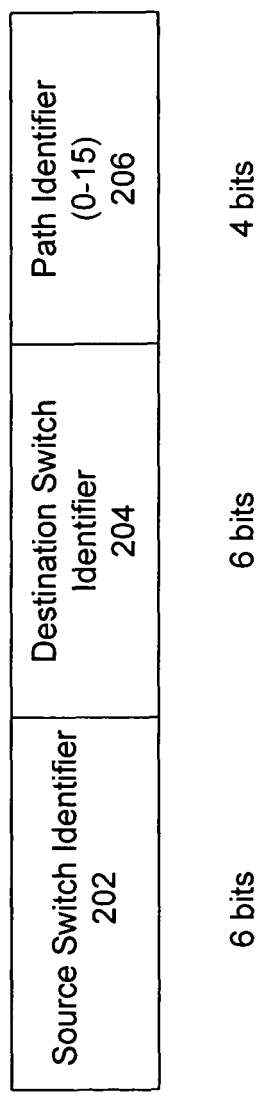
FIG. 2 is a diagram of a path tag in accordance with an embodiment of the invention.

FIG. 2 is a diagram of a path tag 200 in accordance with an embodiment of the invention. The path tag 200 includes a source switch identifier 202, a destination switch identifier 204, and a path identifier 206.

In the illustrated embodiment, the path tag is seventeen bits in length. In particular, the source switch identifier 202 is six bits long, the destination switch identifier 204 is six bits long, and the path identifier 206 is four bits long. With the switch identifiers being six bits long, sixty-three different switches in the mesh may be distinguished and identified. (The value zero for the switch id being considered an invalid value in this implementation.) With the path identifier 206 being four bits long, fifteen different paths may be identified per source/destination pair. (The value zero for the path id again being considered invalid in this implementation.)

Other embodiments may have other lengths for these fields, resulting in different numbers of identifiable switches and paths. For example, another embodiment may utilize a three byte tag that provides one byte (eight bits) each for the source switch identifier, the destination switch identifier, and the path identifier.

Consider, for example, the mesh 101 depicted in FIG. 1. Path tags 200 of the format depicted in FIG. 2 may be used to identify different paths, for instance, from switch A to switch D. Given those source and destination switches, each path tag 200 would include an identifier corresponding to switch A in the source switch identifier field 202 and an identifier corresponding to switch D in the destination switch identifier field 204. The path identifier field 206 identifies a particular path (among the various paths) through the mesh topology from the source switch to the destination switch.

For instance, a first path may go directly from A to D by exiting port 2 of switch A and entering port 11 of switch D. A second path (not shown) may travel from A to D via switch C by exiting port 3 on switch A, entering port 7 of switch C, exiting port 9 of switch C, and entering port 12 of switch D. And so on for other possible paths.

B. Providing User-Configurable Paths

As discussed above in relation to FIGS. 1 and 2, mesh path tagging in general involves assigning path tags to specific routes or paths through a switching mesh. Packets forwarded with a path tag will be forwarded along the associated route or path to the terminating edge switch in the mesh. At the terminating edge switch (the mesh switch terminating the path), the packet is untagged (has the path tag removed) and forwarded out the appropriate port (or ports in the case of a broadcast path).

In a conventional switching mesh, a customer or user configures a set of ports to be mesh ports and connects mesh switches together to form the switching mesh. The conventional switching mesh software then determines the best path between two switches and assigns traffic to that path.

In accordance with an embodiment of the invention, a customer or user is enabled by appropriate modifications of the mesh switches so as to be able to specify and control which paths certain types of traffic will take. As disclosed herein, this may be accomplished efficiently by using path tags and associating a particular path tag to a specified type of traffic. The traffic may be specified using relatively generic selection criteria such as destination MAC address, or more specific selection criteria such as source/destination IP address pairs and TCP/UDP port numbers.

Figure 3:
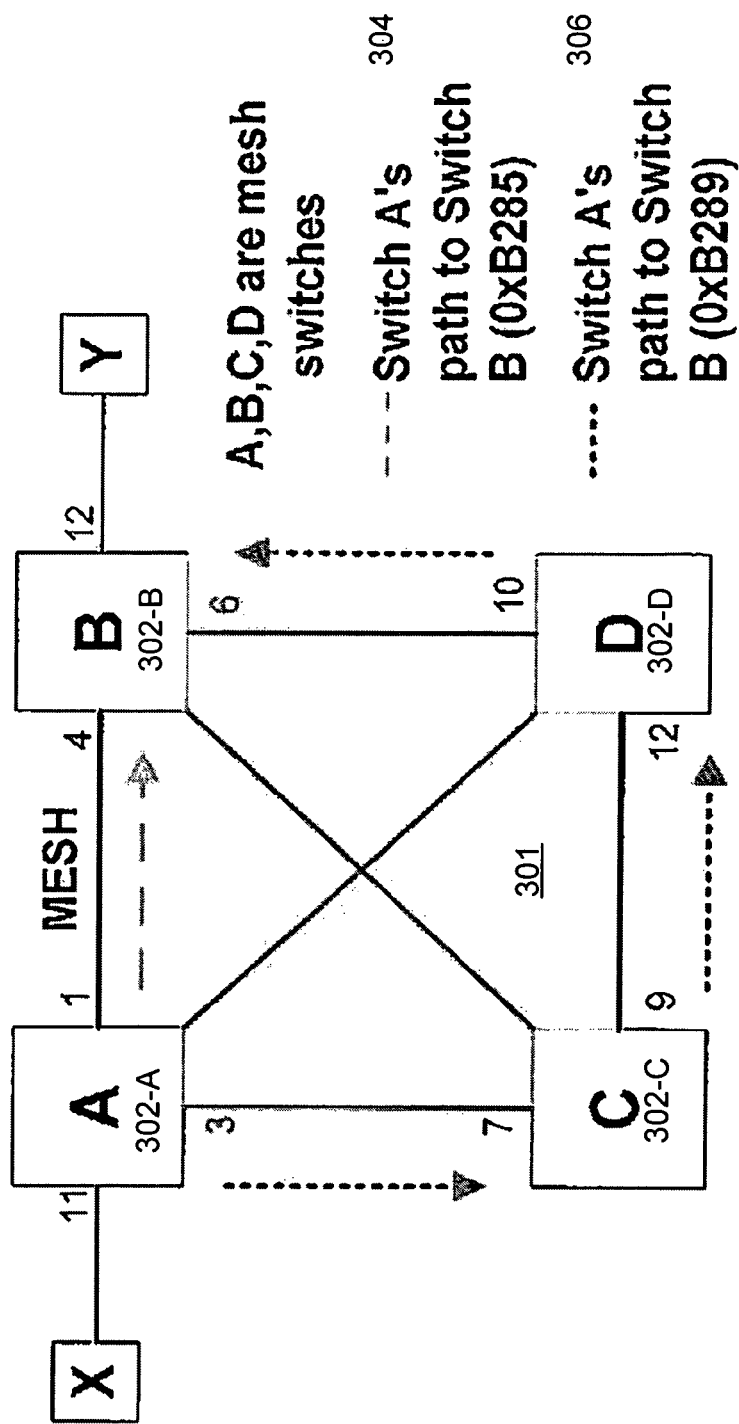
FIG. 3 is a diagram illustrating two different mesh paths from a source switch to a destination switch in accordance with an embodiment of the invention.

FIG. 3 is a diagram illustrating two different mesh paths from a source switch to a destination switch in accordance with an embodiment of the invention. In the example of FIG. 3, the best (lowest "cost") path between switches A 302-A and B 302-B as determined by a conventional cost protocol may be the direct link 304 between them. As shown in the figure, the direct link 304 may correspond, in this instance, to the path tag 0xB285. As such, traffic entering switch A on a non-mesh port destined for switch B would conventionally be assigned to the path tag 0xB285 (assuming no load balancing is being applied).

However, consider the situation where there is an alternative path 306 from switch A 302-A through switches C 302-C and D 302-D and ending at switch B 302-B. As shown in the figure, this alternative path 306 may correspond, in this instance, to the path tag 0xB289. Further, consider that this alternative path 306 comprises a secure path using fiber links enclosed within steel conduits for security purposes, while the direct path 304 comprises a less secure path.

In accordance with an embodiment of the invention, a user may utilize a network management tool to specify a policy such that the path tag 0xB289 is attached to certain traffic (traffic that requires a high level of security), while the path tag 0xB285 is attached to other traffic (not requiring a high level of security). By doing so, the traffic requiring a high-level of security will follow the alternative (secure) path 306, while the other traffic will travel along the direct (insecure) path 304.

In other examples, different criteria may be used to separate traffic along the different mesh paths. The criteria may be based upon the packet data and/or information pertaining to a relationship between the packet and the switch. Selection criteria based upon the packet data may depend upon, for example, source/destination MAC/IP addresses, user datagram protocol (UDP) port number, transmission control protocol (TCP) port number, Quality of Service (QoS) level, and so on. Selection criteria based upon the packet/switch relationship may depend upon, for example, inbound port, outbound port, VLAN, priority queue that the packet was put in, and so on. In one specific example, a subset of packets to travel via a particular path may include all packets for a given VLAN. In another specific example, a subset of packets to travel via a particular path may include those packets received on a specific inbound port of a particular switch.

Figure 4A:
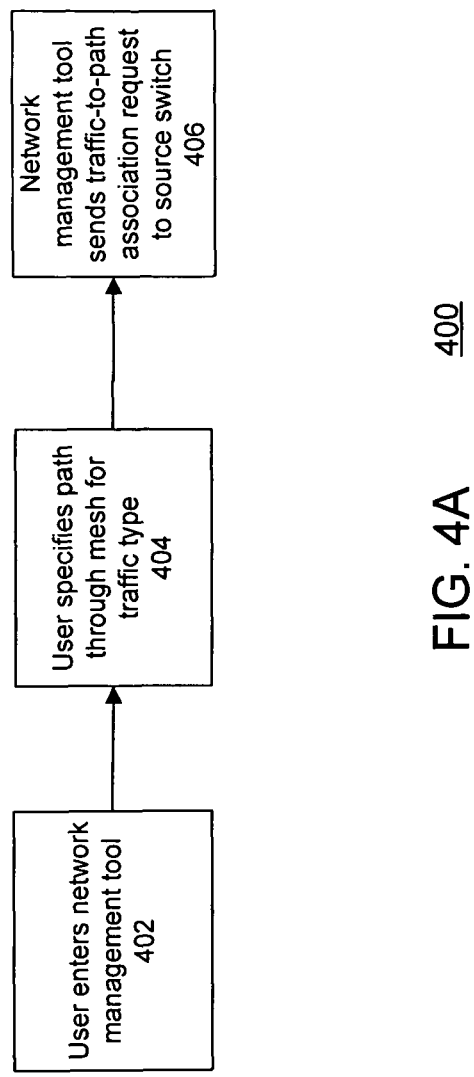
FIG. 4A is a flow chart depicting an example procedure at a source mesh switch in accordance with an embodiment of the invention.

FIG. 4A is a flow chart depicting an example procedure 400 at a source (originating) mesh switch in accordance with an embodiment of the invention. Consider in this example, that a customer or user desires to assign a certain type of traffic to a given path.

The user enters 402 a network management tool. The network management tool is an application that oversees the switching mesh. In accordance with an embodiment of the invention, the network management tool is configured so as to be able to set up policies for directing specified types of traffic along a given path. Via the network management tool, the user specifies 404 a particular path through the switching mesh for a specific type or types of traffic. The network management tool may be configured to send 406 a traffic-to-path association request to the source switch, wherein the source switch is the mesh switch at the beginning of the user-specified path.

Figure 4B:
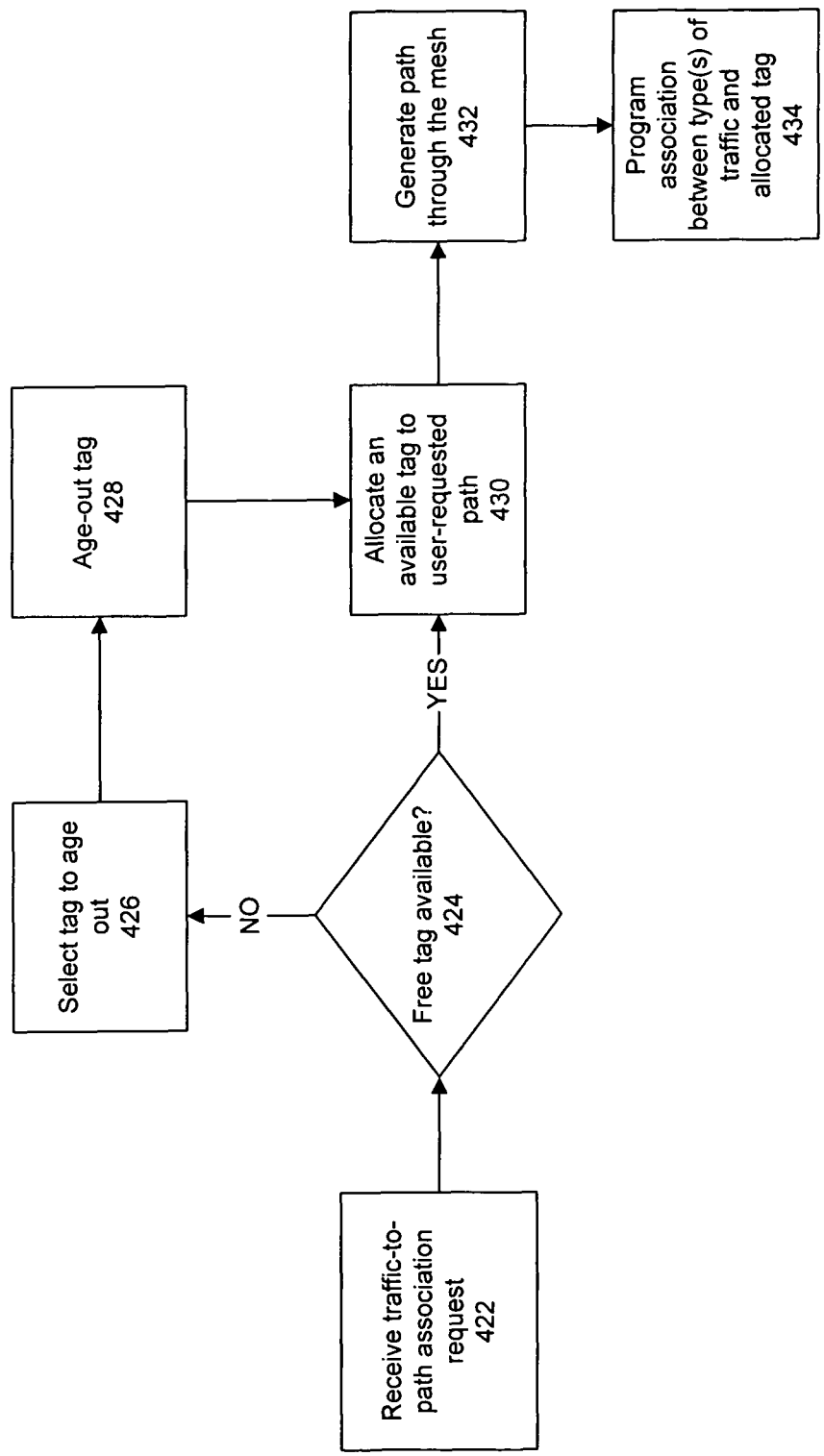
FIG. 4B is a flow chart depicting an example procedure at the source switch in accordance with an embodiment of the invention.

FIG. 4B is a flow chart depicting an example procedure 420 at the source switch in accordance with an embodiment of the invention. The source switch receives 422 the traffic-to-path association request from the network management tool.

The source switch may be configured to then determine 424 whether it has a free (un-used) path tag available. As discussed above in relation to FIG. 2, each source/destination switch pair may have multiple path tags that are assignable to the various potential paths through the mesh from the source switch to the destination switch. If no path tag is available, then the source switch may be configured to select 426 a path tag to be aged out. For example, the least-recently-used path tag may be selected 426 to be aged out. After the selected path tag is aged out 428, then that path tag becomes freely available.

With a free path tag available, the source switch allocates 430 one of the available path tags for the user-requested path and builds or generates 432 the path through the mesh.

In one implementation, the path through the mesh may be built or generated 432 by a communication protocol between switches so as to add an appropriate entry in a tag table at each switch along the path. The tag table may be configured to indicate for each path tag entry a corresponding egress port at that switch. The tag table may also be advantageously configured with a termination bit for each entry, wherein the termination bit indicates that the path terminates on the local switch. Alternatively, instead of using a termination bit, a look-up may be used to determine if a local switch terminates the path.

Note that, for redundancy purposes, alternate configured tags can be provided should the path break anywhere along the defined tagged path. The hardware can be programmed to automatically use a back up tag in the event of link failure. As with standard tagged meshing a message would be sent to the source of the traffic informing it of the break, where the source could then use what it determines as an alternate path. Different alternate path tags may be used for each switch along the way so that it could immediately switch over the traffic while the link break message propagates to the switch sourcing the traffic. If slower failover is acceptable, then only a single alternate tagged path originating from the source switch may be used.

Once the path is formed, the source switch may be programmed 434 to associate the assigned path tag to the type(s) of traffic specified by the user. The programming 434 may be implemented via either software instructions (typically slower) or hardware circuitry (typically faster). In other words, the source switch is programmed 434 to apply the selection criteria such that those packets satisfying the criteria are embedded with the allocated path tag.

As discussed above, the selection criteria used for distinguishing different types of traffic can be based, for example, on the port that the packet is received upon, MAC addresses, IP addresses, TCP/UDP port numbers, VLAN identifiers, QoS level, and various other criteria. Depending upon the particular system implementation, the hardware at the source switch may need to be modified so as to support the functionality of assigning a particular path tag based upon some of these criteria.

C. Example Packet Switch

Figure 5:
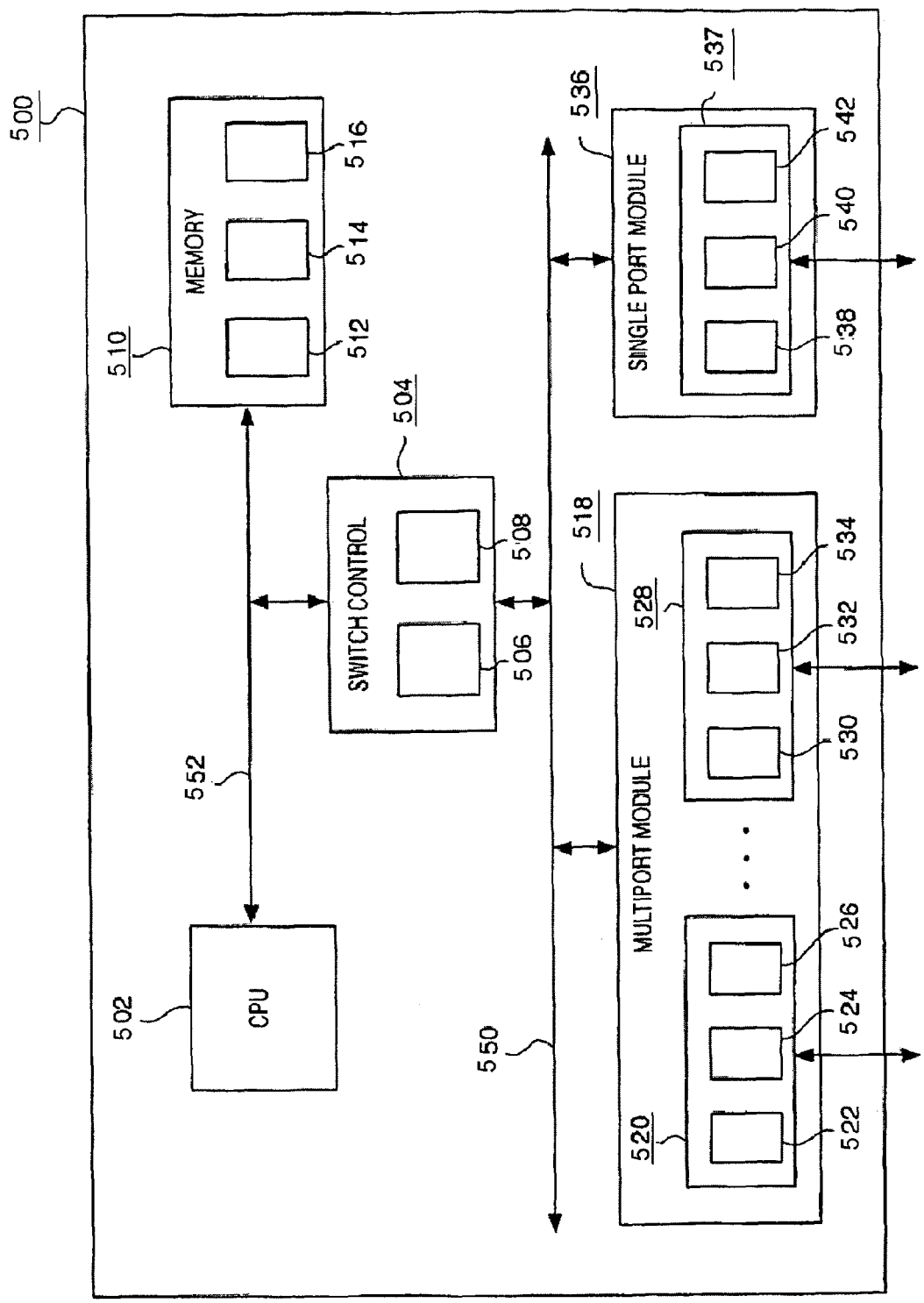
FIG. 5 is a schematic diagram of an example packet switch operable in accordance with an embodiment of the invention.

FIG. 5 is a schematic diagram of an example packet switch 500 operable in accordance with an embodiment of the invention. Various configurations of packet switches may be used, and the configuration shown in FIG. 5 is just one example.

A central processing unit (CPU) 502 may be configured to perform overall configuration and control of the switch 500 operation. The CPU 502 may be configured to operate in cooperation with a switch control 504. The switch control 504 may comprise an application specific integrated circuit (ASIC) designed to assist the CPU 502 in performing packet switching at high speeds required by modern networks.

The switch control 504 may be configured to control the "forwarding" of received packets to appropriate locations within the switch for further processing and/or for transmission out another switch port. Inbound and outbound high speed FIFOs (506 and 508, respectively) may be included with the switch control 504 for exchanging data over switch bus 550 with port modules.

The memory 510 may be configured to store data and instructions for execution by the processor (CPU) 502. The memory 510 may also be configured to include a high and low priority inbound queue (512 and 514, respectively) and outbound queue 516. The high priority inbound queue 512 may be used to hold received switch control packets awaiting processing by CPU 502 while the low priority inbound queue 514 holds other packets awaiting processing by CPU 502. The outbound queue 516 may be configured to hold packets awaiting transmission to switch bus 550 via switch control 504 through its outbound FIFO 508.

The CPU 502, switch control 504 and memory 510 may be configured to exchange information over processor bus 552 largely independent of activity on switch bus 550.

The ports of the switch may be implemented as plug-in modules that connect to switch bus 550. Each such module may be, for example, a multi-port module 518 having a plurality of ports in a single module or may be a single port module 536. Such a multi-port module 518 may provide an aggregate packet switch performance capable of handling a number of slower individual ports. For example, in one implementation, both the single port module 536 and the multi-port module 518 may be configured to provide, for example, approximately 1 Gbit per second packet switching performance. The single port module 536 therefore can process packet switching on a single port at speeds up to 1 Gbit per second. The multi-port module 518 would provide similar aggregate performance but distributes the bandwidth over, preferably, eight ports each operating at speeds, for example, of up to 100 Mbit per second. These aggregated or trunked ports may be seen as a single logical port to the switch.

Each port may include high speed FIFOs for exchanging data over its respective port. Specifically, each port, 520, 528, and 537, may include an inbound FIFO 522, 550, and 538, respectively for receiving packets from the network medium connected to the port. Further, each port 520, 528, and 537, may include a high priority outbound FIFO 524, 532, and 540, respectively, and a low priority outbound FIFO 526, 534, and 542, respectively. The low priority outbound FIFOs may be used to queue data associated with transmission of normal packets while the high priority outbound FIFO may be used to queue data associated with transmission of control packets. Each module (518 and 536) may be configured to include circuits (not specifically shown) to connect its port FIFOs to the switch bus 550.

As packets are received from a port, the packet data may be applied to the switch bus 550 in such a manner as to permit monitoring of the packet data by switch control 504. Switch control 504 may be configured to manage access to switch bus 550 by all port modules (i.e., 518 and 536). All port modules may be configured to "listen" to packets as the packets are received and applied by a receiving port module to switch bus 550. If the packet is to be forwarded to another port, switch control 504 may apply a trailer message to switch bus 550 following the end of the packet to identify which port should accept the received packet for forwarding to its associated network link.

In accordance with an embodiment of the invention, the switch control ASIC 504 is configured to insert, remove, and analyze a path tag 200 at a fixed location within a packet. In addition, memory 510 in each switch may be configured to include a tag table, as discussed above.

Furthermore, in accordance with an embodiment of the invention, a portion of the memory 510 in the switch 500 is configured to store a table of tag entries (the tag entry table). As discussed above, each tag entry in the table includes forwarding information pertaining to a particular path tag. The forwarding information may include the port (or set of ports) out of which the packet is to be forwarded.

D. Advantages and Conclusion

In the conventional systems and methods for switching meshes, packets flow through the mesh based on the best (lowest cost) path available at the time the destination MAC address is learned, and there is typically no method of a customer controlling the way traffic flows though the mesh. A network administrator may have previously been able to set up paths that all traffic on a given VLAN would take between two switches. However, setting up those paths generally required a laborious procedure involving adding/removing links individually, or possibly configuring the spanning tree (including priority, cost, and so on), in order to obtain the desired configuration. Moreover, such a configuration would only allow traffic on a given VLAN to travel along a particular path.

The above disclosed systems and methods for providing user-configurable paths in a switching mesh provide various advantages over the conventional systems and methods. The above-disclosed systems and methods enable a customer to efficiently customize a switching mesh such that a specified type of traffic takes a particular path. A packet that does not meet any of the specified types may be forwarded along a path determined via a conventional technique (such as, for example, the lowest "cost" between the source and destination switches).

The above-disclosed systems and methods provide a very flexible and customizable topology to solve various traffic routing problems. In one example, this technique provides an efficient way to route secure traffic through a switching mesh via a separate path from insecure traffic, without putting the secure and insecure traffic on different VLANs.

In another example, this technique provides an efficient way to route through the switching mesh high-priority traffic via a faster (shorter) path and lower-priority traffic via a slower (longer) path.

In another example, this technique may provide an efficient backup solution. For instance, the start of a system backup may trigger a network management policy relating to the backup traffic. If users are still on line, then the backup process may utilize slower links and not impact the user. Time of day policies could also be implemented where the system backup takes a high speed path during a light usage period (for example, from 12:00 AM to 5:00AM) and after that point is put on a lower speed path so as not to impact users.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of configuring a traffic-associated path through a switching mesh, the method comprising:
   receiving by the source switch a request to associate a type of traffic to a specified path, wherein the specified path is designated for a type of traffic through the switching mesh and wherein the source switch is located at a beginning of the specified path;
   allocating a path tag to the specified path, wherein the source switch allocates the path tag to the specified path;
   building the specified path through the switching mesh, wherein the source switch builds the specified path;
   programming an association between the type of traffic and the path tag, wherein the path tag is to be applied to subsequent traffic of the type of traffic in the request received by the source switch;
   applying selection criteria to a packet received by the source switch to determine whether the packet comprises said type of traffic;
   determining whether the packets satisfy the selection criteria by determining whether the packets comprise packets of a specific virtual local area network; and
   assigning the path tag to packets which satisfy the selection criteria.

2. The method of claim 1, wherein an alternate path is defined at each switch along the specified path so as to be usable upon a link failure anywhere along the specified path.

3. The method of claim 1, wherein a network management tool for the switching mesh is utilized to specify the type of traffic associated with the specified path and path tag as distinct from other types of traffic on the switching mesh.

4. The method of claim 3, wherein the network management tool also specifies the specified path and the alternate path(s), and wherein the request to associate the type of traffic to the specified path is sent by the network management tool to the source switch.

5. The method of claim 1, further comprising:
   determining whether a path tag is available to allocate; and
   aging out a used path tag if no path tag is available.

6. The method of claim 1, wherein the specified path is generated by adding an entry in a tag table at each switch along the specified path, wherein the entry specifies at least an egress port corresponding to the path tag.

7. The method of claim 1, wherein the selection criteria utilizes data in the packet.

8. The method of claim 1, wherein said selection criteria utilizes information pertaining to a relationship between the packet and the source switch.

* * * * *